(12) United States Patent
Gioannini et al.

(10) Patent No.: US 7,891,174 B2
(45) Date of Patent: Feb. 22, 2011

(54) MANAGEMENT OF REGENERATION OF A DIESEL PARTICULATE FILTER

(75) Inventors: Alberto Gioannini, Orbassano (IT); Francesco Bechis, Orbassano (IT); Marco Tonetti, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 859 days.

(21) Appl. No.: 11/812,860

(22) Filed: Jun. 22, 2007

(65) Prior Publication Data
US 2008/0010971 A1      Jan. 17, 2008

(30) Foreign Application Priority Data
Jun. 6, 2008 (EP) .................................. 06425447

(51) Int. Cl.
*F01N 3/00* (2006.01)
(52) U.S. Cl. .............................. 60/295; 60/274; 60/286; 60/311
(58) Field of Classification Search .................. 60/74, 60/285, 286, 295, 297, 311, 274, 277, 303
See application file for complete search history.

(56) References Cited

U.S. PATENT DOCUMENTS

| | | | |
|---|---|---|---|
| 6,820,418 B2 * | 11/2004 | Nakatani et al. | 60/297 |
| 7,028,466 B2 * | 4/2006 | Kondou et al. | 60/295 |
| 7,031,827 B2 * | 4/2006 | Trudell et al. | 701/114 |
| 7,104,049 B2 * | 9/2006 | Hiranuma et al. | 60/295 |
| 7,219,493 B2 * | 5/2007 | Tsutsumoto et al. | 60/297 |
| 7,367,182 B2 * | 5/2008 | Takahashi et al. | 60/286 |
| 7,500,358 B2 * | 3/2009 | Singh et al. | 60/295 |
| 2003/0230078 A1 | 12/2003 | Yahata | |

FOREIGN PATENT DOCUMENTS

| | | |
|---|---|---|
| EP | 1035314 | 9/2000 |
| EP | 1281852 | 2/2003 |
| EP | 1333165 | 8/2003 |
| EP | 1455070 | 9/2004 |
| EP | 1541829 | 6/2005 |
| FR | 2872208 | 12/2005 |
| WO | WO 96/03571 | 2/1996 |

OTHER PUBLICATIONS

European Seach Report mailed Dec. 7, 2006 in European Appln. No. 06425447.7 [3 pages].

* cited by examiner

*Primary Examiner*—Binh Q Tran
(74) *Attorney, Agent, or Firm*—Davidson Berquist Jackson & Gowdey, LLP (57) ABSTRACT

Described herein is a method for managing regeneration of a diesel-particulate filter for a gas-exhaust system of the internal-combustion engine of a vehicle, comprising a first step of regeneration of the diesel-particulate filter during which the diesel-particulate filter is regenerated at a first regeneration rate, and a second step of regeneration of the diesel-particulate filter, during which the diesel-particulate filter is regenerated at a second regeneration rate higher than the first regeneration rate.

11 Claims, 4 Drawing Sheets

MANAGEMENT OF REGENERATION OF A DIESEL PARTICULATE FILTER

FIELD OF THE DISCLOSURE

The present invention relates to management of regeneration of a diesel-particulate filter (DPF).

BACKGROUND and BRIEF DESCRIPTION

As is known, in order to reduce atmospheric pollution, the standards of the majority of countries are imposing increasingly stringent limits upon the composition of the exhaust gases produced by internal-combustion engines.

In particular, as regards diesel engines, the main problems are represented by the presence, in the exhaust gases, of nitrogen oxides (NOx) and of particulate, whereas carbon oxides (CO) and hydrocarbons (HC) do not constitute any particular problem.

Many methods have so far been proposed in order to bring the amount of particulate present in exhaust gases introduced into the environment down to minimum values. Amongst these, however, without any doubt, the provision on the gas-exhaust pipe of a diesel-particulate filter, also known as "soot catcher" or "soot trap", has been recognized for many years now in the field of automobile engines as the final answer to the problem of emissions of particulate of diesel engines.

In particular, a diesel-particulate filter is in general constituted by parallel channels with alternately obstructed porous walls. The obstructions force the exhaust gases to traverse the side walls of the channels so that the unburnt particles constituting the particulate are first withheld in the porosities of the side walls themselves and then, when the latter are completely filled, accumulate on the internal surfaces of the walls of the channels to form a layer of accumulation.

As the accumulation of particulate increases on the internal surfaces of the walls of the channels, also the drop in pressure on the diesel-particulate filter and hence the counterpressure generated by the diesel-particulate filter itself increases.

The particulate cannot hence be accumulated indefinitely in so far as high accumulations cause:

deterioration of performance, driveability and consumption of the engine, until, in limit conditions, engine itself stalls; and destruction of the diesel-particulate filter in the case of self-ignition and uncontrolled combustion of the particulate; in fact, in the presence of high accumulations of particulate, in particular driving conditions, phenomena of "critical" regeneration may be triggered, which consist in the sudden and uncontrolled combustion of the particulate: consequently, the high temperatures that are generated within the ceramic matrix of the diesel-particulate filter can cause damage thereto.

It is consequently necessary to remove periodically the particulate accumulated, performing the so-called "regeneration" of the diesel-particulate filter. In particular, in the automobile-engine field, by "regeneration" of the diesel-particulate filter is understood the combustion of the particulate accumulated (prevalently made up of carbon, C), which, in contact with the oxygen present in the exhaust gases, transforms into carbon monoxide, CO, and carbon dioxide, $CO_2$.

However, this reaction occurs naturally (i.e., without the use of additives) only at temperatures higher than approximately 600° C., and said temperature levels are much higher than those that are measured at inlet to the diesel-particulate filter in conditions of normal operation of the engine.

It is consequently necessary, in certain conditions, and namely, when given levels of accumulation of particulate are detected in the diesel-particulate filter, to raise the temperature of the exhaust gases at inlet to the diesel-particulate filter itself artificially until self-ignition of combustion of the particulate is obtained.

Regeneration of a diesel-particulate filter constitutes the main problem linked with use of said type of filters in the automotive field.

In particular, the methods of self-ignition of combustion of the particulate may be broadly divided into two major categories, according to the type of approach adopted: belonging to the first category are methods of self-ignition based upon the use of an additive in the diesel fuel, which, by acting as catalyst, enables a reduction in the temperature for triggering regeneration of approximately 100 to 150° C., whilst belonging to the second category are those methods of self-ignition of combustion of the particulate based upon control of combustion of the engine.

On account of the numerous disadvantages, the methods belonging to the first category have been abandoned by practically all of the major automobile manufacturers in favour of the methods belonging to the second category.

For the above purpose, the advent of first-generation common-rail injection systems, capable of performing two consecutive injections in each cylinder during one and the same engine cycle, has enabled progress to be made in the field of regeneration of diesel-particulate filters.

For example, in the patent application PCT/IT95/00124 filed in the name of the present applicant on Jul. 21, 1995 and published on Feb. 8, 1996 under No. WO 96/03571 there is proposed a strategy in which the increase in temperature of the exhaust gases at inlet to the diesel-particulate filter is obtained by performing, in addition to the main injection, a post-injection during the expansion phase. The phasing of the post-injection with respect to the main injection and the amount of fuel injected are determined in such a way that the combustion of fuel in the expansion phase is such as to determine an increase in the temperature of the exhaust gases sufficient to cause self-triggering of regeneration of the diesel-particulate filter.

A different strategy for obtaining the increase in temperature of the exhaust gases at inlet to the diesel-particulate filter envisages, in addition to the main injection, a post-injection performed during the exhaust phase. In fact, since in general the diesel-particulate filter is integrated in a single canister together with an oxidizing catalytic converter for abating the unburnt hydrocarbons and carbon monoxide, set upstream of the diesel-particulate filter itself, a fuel post-injection performed prevalently in the exhaust phase of the engine means that the fuel injected will not contribute, except to a reduced extent, to combustion, generating a motive torque, and hence will reach the catalytic converter directly in the unburnt state, thus determining an increase in the hydrocarbons HC present in the exhaust gases, which, in turn, are oxidized within the oxidizing catalytic converter. The exothermic reaction of oxidation that occurs within the oxidizing catalytic converter brings about the rise in temperature of the exhaust gases at inlet to the diesel-particulate filter, which, as is known, is located downstream of the oxidizing catalytic converter, thus enabling regeneration of the diesel-particulate filter itself.

Enormous headway in the field of regeneration of diesel-particulate filters has then been achieved with the advent of second-generation common-rail injection systems, which are able to perform up to six consecutive injections in each cylinder during one and the same engine cycle. For a more detailed treatment of the subject regarding multiple injections, reference may be made to the European patent application No. EP 00104651.5 filed on Mar. 3, 2000 in the name of the present applicant and published on Sep. 13, 2000 under No. EP 1035314, the contents of which are considered entirely incorporated herein.

For example, in the European patent application No. EP 02017387 filed in the name of the present applicant on Aug. 2, 2002 and published on Feb. 5, 2003 under No. EP 1281852, it is proposed to obtain the rise in temperature of the exhaust gases by simply varying the phasing of one or more of the injections with respect to the phasing of the injections themselves in conditions of non-regeneration of the diesel-particulate filter.

First-generation diesel-particulate filters are made using ceramic materials with a much higher thermomechanical resistance (silicon carbide), and these characteristics of strength enable management of regeneration in a not particularly accurate way but with the sole purpose of performing regeneration in the shortest time possible.

Consequently, the strategies of regeneration currently implemented in vehicles are conceived in such a way as to speed up as much as possible the step of warming-up of the diesel-particulate filter providing, in some cases, a sort of overboost of temperature such as to speed up light-off of the particulate.

This type of approach presents as contraindication the onset of high temperature peaks and of high thermal gradients, which, in particularly critical cases, can damage the diesel-particulate filter or even cause its failure. Failure of this sort is normally compound and hence does not cause deterioration in the filtering efficiency according to the Euro-4 standard. However, in future, with the advent of the new standards, probably the vehicles that will undergo failure of the diesel-particulate filter will no longer be able to meet the limits envisaged by law.

In addition, should the aim be to create diesel-particulate filters with less strong ceramic materials, and hence less costly than the ones currently used, the present mode for managing regeneration of the diesel-particulate filter would not guarantee reliability over time thereof.

The aim of the present invention is to provide a method for managing regeneration of a diesel-particulate filter that will enable the drawbacks indicated above to be overcome at least in part.

Provided according to the present invention is a method for managing regeneration of a diesel-particulate filter as defined in the annexed claims.

BRIEF DESCRIPTION OF FIGURES

For a better understanding of the present invention, a preferred embodiment is now described, purely by way of non-limiting example and with reference to the attached plate of drawings, wherein.

DESCRIPTION OF PRESENTLY PREFERRED EXEMPLARY EMBODIMENTS

Broadly speaking, the present invention stems from the observation of the reaction of oxidation that is triggered within the filter, namely:

This is, in fact, an exothermic reaction that generates high thermal gradients and high peaks in temperature that are proportional to the rate of the reaction itself.

In particular, as described in A. Yezerets, N. W. Currier and H. A. Eadler, 2003 *Experimental Determination of the Kinetics of Diesel Soot Oxidation by $O_2$—Modeling Consequences*, SAE 2003-01-0833, the kinetics of the reaction of oxidation can be expressed by the following equation:

$$r = k \cdot [C]^a \cdot [O_2]^b \cdot [H_2O]^c$$

where:
r is the rate of the reaction expressed in mol/s,
k is a constant of the rate of reaction given by equation $k = A \cdot e^{(-E/RT)}$, where A is a frequency factor, E is the energy of activation of the reaction in J/mol, R is the ideal-gas constant 8.3145 J/(mol·K), and T is the temperature at which the reaction of oxidation occurs;
[C] is the amount of particulate in expressed in mol;
$[O_2]$ and $[H_2O]$ are, respectively, the concentrations of oxygen and water expressed in mol; and
a, b and c are the respective orders of reaction.

Consequently, by appropriately controlling the kinetics of the reaction of oxidation, it is possible to control the peaks of temperature that are generated within the diesel-particulate filter, thus preventing the temperature peaks and the thermal gradients that can damage the diesel-particulate filter.

The reaction of oxidation can be controlled through the following physical-quantities:
the amount of particulate ([C]) that participates in the reaction of oxidation;
the temperature within the diesel-particulate filter (T); and
the amount of oxygen ($[O_2]$) that participates in the reaction of oxidation.

Consequently, the inventive idea underlying the present invention is that of appropriately controlling the rate of the reaction of oxidation of the particulate that takes place within the diesel-particulate filter, and consequently the rate of regeneration of the diesel-particulate filter itself, defined as the amount of particulate eliminated (burnt) per unit time, acting on the physical quantities listed above in such a way as to attenuate the temperature peaks and the high thermal gradients that occur both at light-off and during propagation of combustion of the particulate itself.

In particular, the inventive idea underlying the present invention is that of varying the rate of regeneration of the diesel-particulate filter during regeneration thereof carrying out in succession two different regeneration steps: a first step in which the diesel-particulate filter is regenerated at a rate lower than that at which regeneration would normally occur in way such as to slow down development of the reaction of oxidation so as to "dampen" in a controlled way the amount of heat developed during the first instants of the reaction of oxidation, and a second step in which the diesel-particulate filter is regenerated at the rate at which regeneration of the diesel-particulate filter is currently performed.

In the case where in the diesel-particulate filter 7 there do not exist the thermo-fluid-dynamic conditions necessary to enable activation of its regeneration, the two steps of regeneration described above can possibly be preceded by a step of warming-up of the diesel-particulate filter 7 designed precisely to create said conditions.

The two different regeneration rates are obtained through appropriate calibrations of the engine that enable exhaust gases to be obtained that are able to slow down as much as possible combustion of the particulate during the first regeneration step and, instead, to speed up combustion of the particulate as much as possible during the second regeneration step.

From the standpoint of calibration of the engine, in order to obtain the above results over the whole plane of operation of the engine, the air at inlet to the engine is controlled, in particular by acting on the throttle valve set on the intake pipe, on the exhaust-gas recirculation (EGR) valve, and on the position of the blades of the turbo-supercharger (and possibly on the swirl of the flow of the air taken in via small throttle valves set on the intake pipe).

Figure 1:
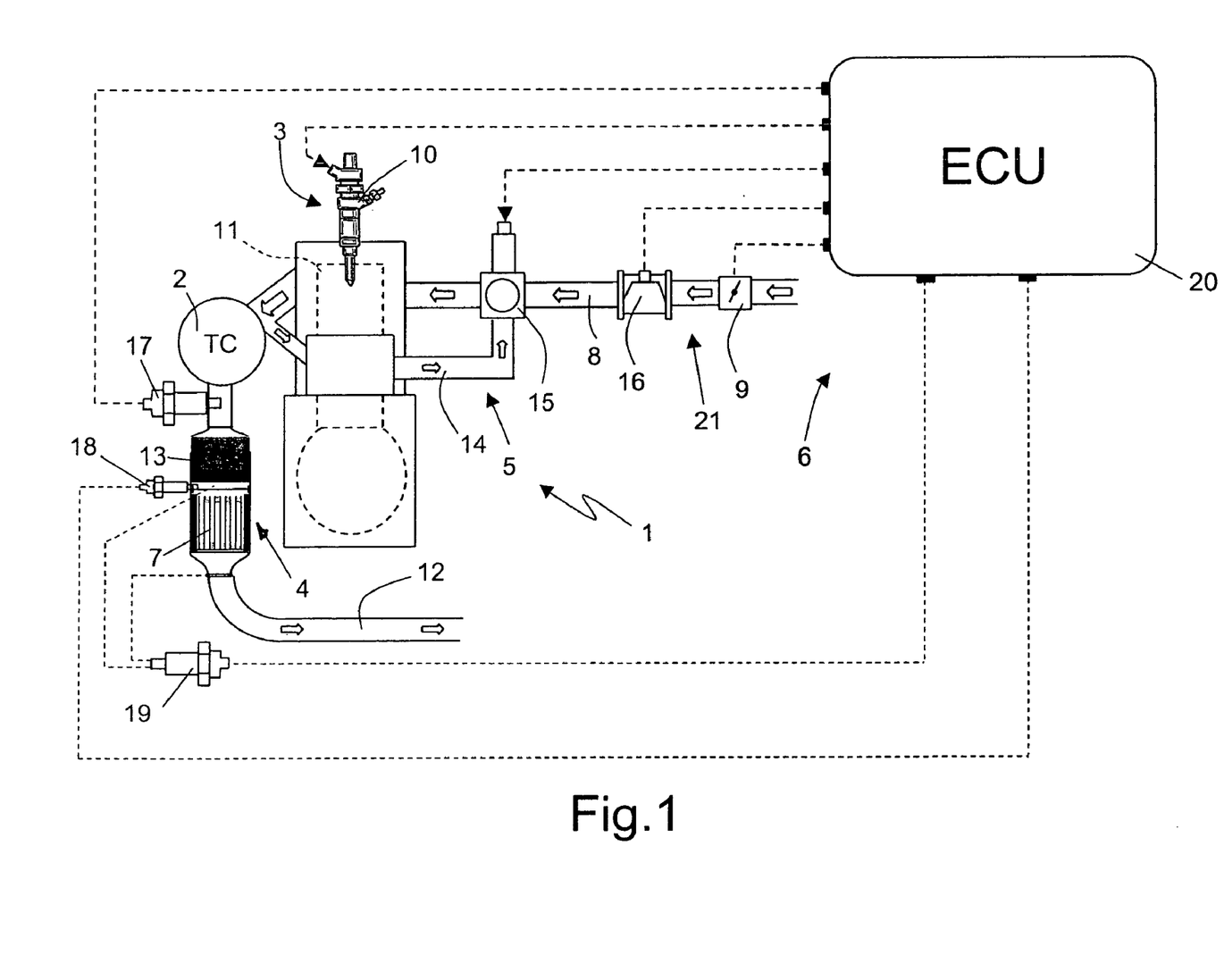
FIG. 1 shows an injection system and an exhaust system for an internal-combustion engine provided with a diesel-particulate filter

FIG. 1 shows the diagram of a system for managing regeneration of the diesel-particulate filter that enables implementation of the present invention.

In particular, designated as a whole by 1 in FIG. 1 is the internal-combustion engine, in particular a supercharged diesel engine, of a vehicle, in particular a road vehicle (not illustrated in the figure), of which only the parts necessary for an understanding of the present invention are shown.

The engine 1 is provided with a turbo-supercharger 2 with variable geometry, a common-rail fuel-injection system 3, an air-intake system 21, an exhaust system 4 for the gases produced by combustion, an exhaust-gas recirculation (EGR) system 5, and an electronic control system 6 for controlling the various systems of the engine 1.

In detail, the air-intake system 21 comprises an air-intake manifold 8, and an electrically controlled throttle valve 9 set along the air-intake manifold 8.

The common-rail fuel-injection system 3 comprises: a plurality of injectors 10, one for each cylinder 11 of the engine 1 (only one of which is shown in the figure), which supply fuel at high pressure to the cylinders 11 of the engine 1; a high-pressure supply circuit (not shown), which supplies fuel at high pressure to the injectors 10; and a low-pressure supply circuit (not shown), which supplies fuel at low pressure to the high-pressure supply circuit. The common-rail fuel-injection system 3 enables implementation, at each engine cycle and in each cylinder 11 of the engine 1, of strategies of fuel injection that envisage actuation of the consecutive multiple injections described in the aforementioned patent application EP 1035314.

The gas-exhaust system 4 comprises a gas-exhaust manifold 12, arranged in cascaded fashion along which are the turbo-supercharger 2, an oxidizing catalytic pre-converter 13, set in a position close to the turbo-supercharger 2, and a diesel-particulate filter 7.

The exhaust-gas recirculation system 5 has the purpose of enabling re-introduction into the air-intake manifold 8 of part of the exhaust gases produced by the engine 1 in order to reduce the temperature of combustion and reduce formation of nitrogen oxides (NOx), and is represented schematically as an exhaust-gas recirculation pipe 14, which connects the gas-exhaust manifold 12, in a point set upstream of the turbo-supercharger 2, with the air-intake manifold 8, in a point set downstream of the throttle valve 9, and with a regulation solenoid valve 15, also known as "EGR solenoid valve", set at the end of the exhaust-gas recirculation pipe 14, at the point in which this gives out into the air-intake pipe 8.

The electronic control system 6 comprises: an airflow meter (debimeter) 16, which is set along the air-intake pipe 8, upstream of the throttle valve 9, and supplies at output an electrical signal indicating the flow of air taken in $AIR_{MEAS}$; an oxygen-concentration sensor 17 of the proportional type, which is set along the gas-exhaust pipe 12, between the turbo-supercharger 2 and the oxidizing catalytic pre-converter 13, and supplies at output an electrical signal indicating the percentage of oxygen in the exhaust gases, and more in particular proportional to the titre at the exhaust, i.e., to the air/fuel ratio of the burnt mixture (A/F); a temperature sensor 18, which is set at outlet from the oxidizing catalytic pre-converter 13, and supplies at output an electrical signal indicating the temperature of the exhaust gases at outlet from the oxidizing catalytic pre-converter 13 that enter the diesel-particulate filter 7; a differential pressure sensor 19, which is set along the gas-exhaust pipe 12, between the inlet and the outlet of the diesel-particulate filter 7, and supplies at output an electrical signal indicating the difference in pressure between the inlet and outlet of the diesel-particulate filter 7; and an electronic control unit 20, which is connected to the airflow meter 16, to the oxygen-concentration sensor 17, to the temperature sensor 18, and to the differential pressure sensor 19. The electronic control unit 20 supplies signals for driving the injectors 10, the EGR solenoid valve 15, and the throttle valve 9, and implements the method for managing regeneration of the diesel-particulate filter 7 according to the present invention described hereinafter with reference to the functional block diagram of FIG. 2.

In particular, in an initial step of calibration of the system, stored in the electronic control unit 20 is a plurality of threshold values (not illustrated in FIG. 2) necessary for management of regeneration of the diesel-particulate filter 7, namely:

a first threshold temperature $T_{IN\_TH}$ at inlet to the diesel-particulate filter 7, for example 400° C.;

a second threshold temperature $T_{F\_TH}$ inside the diesel-particulate filter 7, for example 550° C.;

a first target temperature $T_{IN\_TARG\_1}$ at inlet to the diesel-particulate filter 7 to be used during the first step of regeneration of the diesel-particulate filter 7, for example 600° C.;

a second target temperature $T_{IN\_TARG\_2}$ at inlet to the diesel-particulate filter 7 to be used during the second step of regeneration of the diesel-particulate filter 7, for example 650° C.;

a first target oxygen concentration $K_{O2\_TARG\_1}$ in the exhaust gases to be used during the first step of regeneration of the diesel-particulate filter 7, for example any value lower than 7% of the volume of the exhaust gases;

a second target oxygen concentration $K_{O2\_TARG\_1}$ in the exhaust gases to be used during the second step of regeneration of the diesel-particulate filter 7, for example the maximum oxygen concentration that can physically be obtained;

a threshold thermal power $P_{T\_TH}$ supplied to the diesel-particulate filter 7, for example 40 000 kJ;

reference values, such as, for example, speed of the vehicle, engine r.p.m., load, etc., which enable identification of the current driving profile of the vehicle (town driving, out-of-town driving, motorway driving, etc.);

a maximum duration $t_{MAX\_1}$ and $t_{MAX\_2}$ of the first regeneration step and of the second regeneration step as a function of the driving profile, for example approximately in the region of 400 s and 200 s, respectively;

a maximum duration $t_{MAX}$ of the entire regeneration step, for example 600 s;

a threshold amount $M_{P\_TH1}$ of particulate accumulated in the diesel-particulate filter 7 beyond which it is necessary to activate regeneration of the diesel-particulate filter 7; and a threshold amount $M_{P\_TH2}$ of particulate present in the diesel-particulate filter 7 beyond which passage to the second regeneration step could damage the diesel-particulate filter 7.

Next, in order to implement the method according to the present invention, the electronic control unit 20 acquires continuously the following quantities measured by the various sensors listed above, i.e.:

the flow of air taken in $AIR_{MEAS}$ measured by the debimeter 15;

the concentration $K_{O2}$ of oxygen in the exhaust gases;

the temperature $T_{IN}$ at inlet to the diesel-particulate filter 7; and the pressure difference between the inlet and outlet of the diesel-particulate filter 7.

Figure 2:
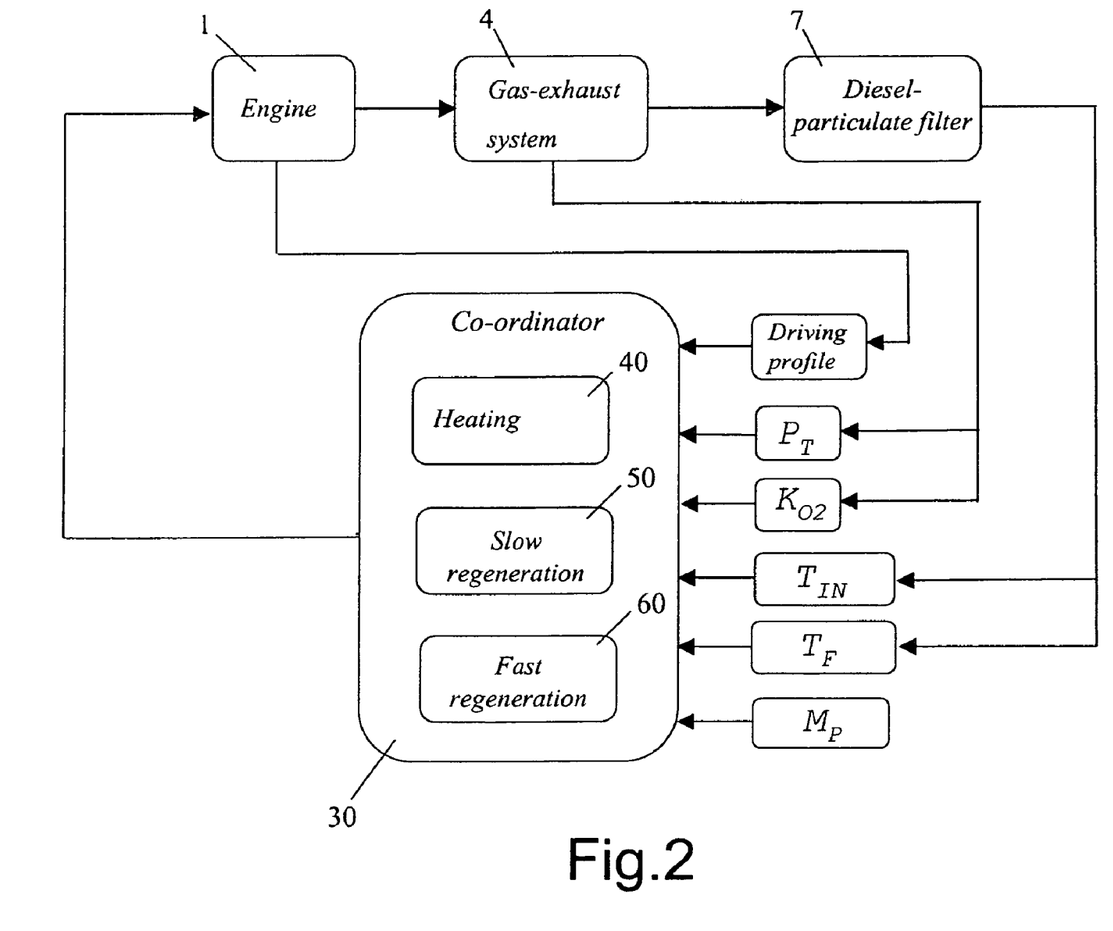
FIG. 2 shows a working block diagram of the method for activation of regeneration of a diesel-particulate filter, according to the present invention.

With reference to FIG. 2, the electronic control unit 20 then determines:

the temperature $T_F$ within the diesel-particulate filter 7 on the basis of the temperature $T_{IN}$ at inlet to the diesel-particulate filter 7 via a physical model of the diesel-particulate filter 7 itself; alternatively, the temperature $T_F$ within the diesel-particulate filter 7 could also be measured directly via a purposely provided temperature sensor (not illustrated in FIG. 1) arranged within the diesel-particulate filter 7;

the current thermal power $P_T$ supplied to the diesel-particulate filter 7 on the basis of the flowrate and temperature of the exhaust gases flowing within the diesel-particulate filter 7, in a way in itself known and hence not described in detail, in which the flowrate of the exhaust gases is equal to the sum of the flow of air taken in $AIR_{MEAS}$ and the flowrate of fuel $Q_{FUEL}$ injected into the cylinders 11 (the latter being a quantity known to the electronic control unit 20);

the driving profile of the vehicle on the basis of engine quantities such as the engine r.p.m. and load; and the amount $M_P$ of particulate accumulated in the diesel-particulate filter 7, in the way described in detail in what follows.

Figure 3:
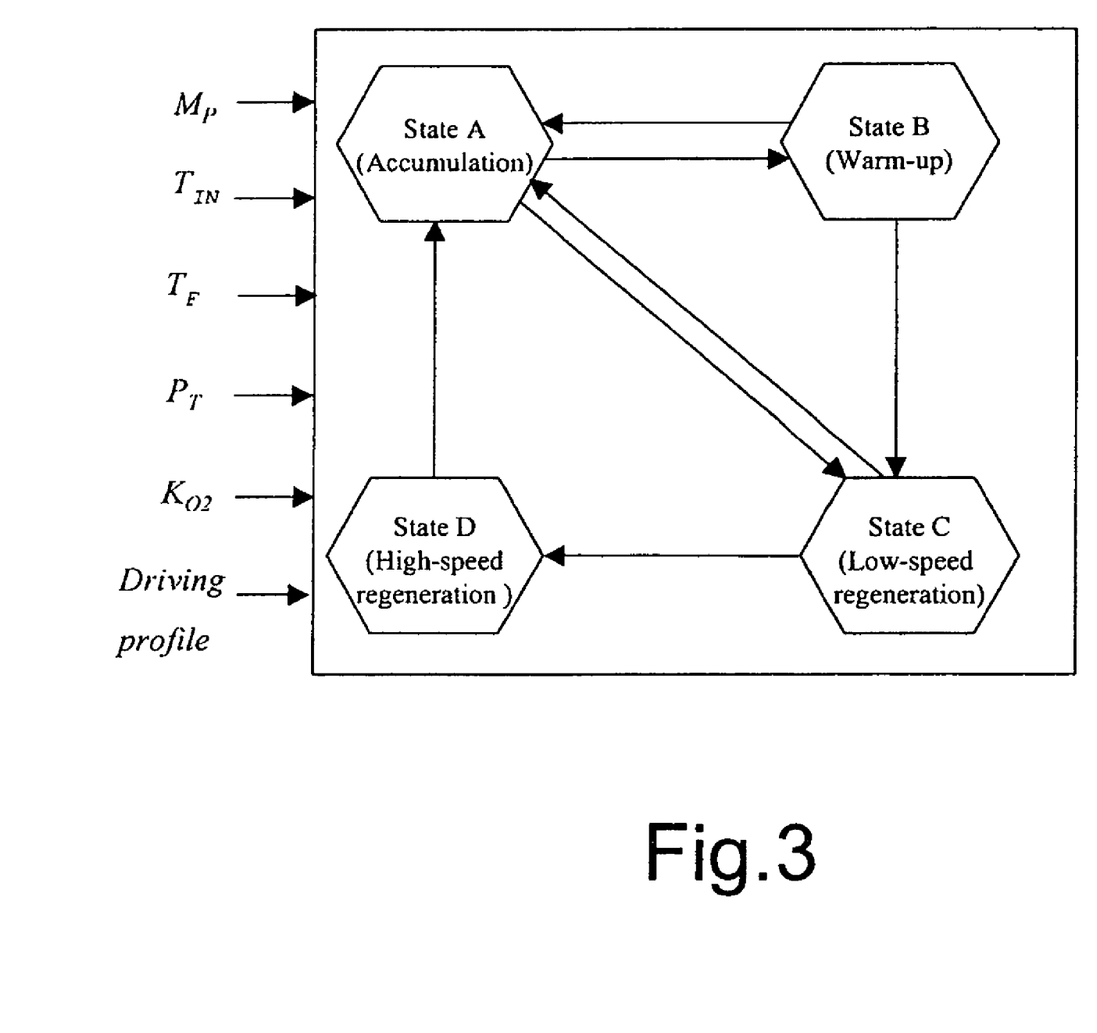
FIG. 3 shows a state diagram of the method according to the present invention.

In order to carry out regeneration of the diesel-particulate filter 7, the electronic control unit 20 implements a co-ordinator 30 (illustrated in FIG. 2), represented in FIG. 3 in the form of a final-state machine, the evolution of which in time depends upon the thermal power $P_T$ supplied to the diesel-particulate filter 7, the thermal state of the system, and the conditions of use of the engine and of the vehicle, and in particular is a function of the concentration $K_{O2}$ of oxygen in the exhaust gases, the temperatures $T_{IN}$ and $T_F$ at inlet to and inside the diesel-particulate filter 7, the current thermal power $P_T$ supplied to the diesel-particulate filter 7, the amount $M_P$ of particulate accumulated in the diesel-particulate filter 7, and the driving current profile of the vehicle.

With reference to the state machine illustrated in FIG. 3, as long as the amount $M_P$ of particulate accumulated in the diesel-particulate filter 7 is lower than the threshold value $M_{P\_TH1}$ stored, the regeneration is not activated, and the final-state machine remains in an initial wait state, designated in FIG. 3 by the letter A, during which there takes place the normal accumulation of particulate within the diesel-particulate filter 7.

When the amount $M_P$ of particulate accumulated in the diesel-particulate filter 7 reaches the stored threshold amount $M_{P\_TH1}$, the electronic control unit 20 determines preliminarily whether the following conditions necessary for activation of regeneration of the diesel-particulate filter 7 are met:

the temperature $T_{IN}$ at inlet to the diesel-particulate filter 7 is equal to or higher than the threshold temperature $T_{IN\_TH}$ stored;

the temperature $T_F$ within the diesel-particulate filter 7 is equal to or higher than the threshold temperature $T_{F\_TH}$ stored; and the thermal power $P_T$ supplied to the diesel-particulate filter 7 is equal to or higher than the threshold thermal power $P_{T\_TH}$ stored.

In the case where the aforesaid conditions are met, there then exist the conditions for enabling immediate activation of regeneration of the diesel-particulate filter 7 so that the final-state machine evolves from the wait state A to a first state of regeneration of the diesel-particulate filter 7, designated in FIG. 2 by 50 and in FIG. 3 by the letter C, described in greater detail in what follows.

In the case, instead, where the aforesaid conditions are not met, there then do not exist the conditions for enabling immediate activation of regeneration of the diesel-particulate filter 7 so that the final-state machine evolves from the wait state A to a state of warm-up of the diesel-particulate filter 7, designated in FIG. 2 by 40 and in FIG. 3 by the letter B, in which the diesel-particulate filter 7 is warmed up until the temperatures at inlet to and within the diesel-particulate filter 7 itself reach the threshold temperatures $T_{IN\_TH}$ and $T_{F\_TH}$ stored. Said warm-up is obtained by increasing the temperature and the flowrate of the exhaust gases that flow within the diesel-particulate filter 7, and consequently the thermal power supplied to the diesel-particulate filter 7 itself.

In particular, the rise in temperature of the exhaust gases is obtained as described in the aforementioned patent application EP 1281852, i.e., by varying the phasing of one or more of the multiple injections made with respect to the phasing thereof in conditions of non-regeneration of the diesel-particulate filter 7. In particular, the rise in temperature of the exhaust gases is obtained by increasing the amount of fuel injected during the post-injection POST and by delaying the post-injection POST in such a way that the combustion will occur as close as possible to opening of the exhaust valves, and the exhaust gases will not have time to cool down and will consequently reach the diesel-particulate filter 7 at a high temperature.

In the case where the thermal power $P_T$ supplied to the diesel-particulate filter 7 were not sufficient for enabling activation of the first modality of regeneration even following upon the action performed on the fuel post-injection POST, the electronic control unit 20 controls opening of the throttle valve 9 in such a way as to increase the flow of air taken in $AIR_{MEAS}$ and, consequently, the flowrate of the exhaust gases, until the thermal power $P_T$ supplied to the diesel-particulate filter 7 reaches the threshold thermal power $P_{T\_TH}$.

In the case where an event were to occur that prevents execution of regeneration when the state machine is in the warm-up state B, for example on account of the engine being turned off, either because the maximum duration $t_{MAX}$ of the entire regeneration step has been exceeded or because an error has occurred or a diagnosis has started, the state machine again returns into the wait state A.

Once the conditions necessary for enabling activation of regeneration of the diesel-particulate filter 7 arise, the final-state machine evolves from the warm-up state B to the first regeneration state C mentioned above, in which the electronic control unit 20 activates the first regeneration step described above, during which the diesel-particulate filter 7 is regenerated at a rate lower than that at which regeneration would occur normally, in such a way as to "dampen" the amount of heat developed during the first instants of the reaction of oxidation, i.e., during which the reaction of oxidation and hence the combustion of the particulate occur slowly, thus preventing the high temperature peaks and the high thermal gradients that tend to damage the diesel-particulate filter 7 itself.

In particular, the first regeneration step at a low rate is implemented by closed-loop control of the temperature within the diesel-particulate filter 7 as well as of the oxygen concentration that participates in the reaction of oxidation occurring within the diesel-particulate filter 7, setting as target values of the temperature $T_{IN}$ at inlet to the diesel-particulate filter 7 and of the oxygen concentration $K_{O2}$ in the exhaust gases the target temperature $T_{IN\_TARG\_1}$ and the threshold concentration $K_{O2\_TARG\_1}$ stored, respectively.

The temperature at inlet to the diesel-particulate filter 7 is controlled by the electronic control unit 20 by controlling the temperature of the exhaust gases in the way described previously, i.e., by acting on the delay of the post-injection POST and on the increase in the amount of fuel injected during the post-injection POST.

The control of the oxygen concentration $K_{O2}$ in the exhaust gases is, instead, performed by appropriately controlling, in a way in itself known, hence not described in detail:
the flow of air taken in $AIR_{MEAS}$ via the throttle valve 9;
the flowrate of the exhaust gases recirculated via the EGR solenoid valve 15; and
the position of the blades of the turbo-supercharger 2.

The oxygen concentration $K_{O2}$ in the exhaust gases can moreover be regulated by appropriately controlling the timing and amount of fuel injected during the injection AFTER, which bring about an increase in the temperature in the combustion chamber, further consuming the residual oxygen.

The duration of the first regeneration step depends prevalently upon the driving profile in which it is performed, as well as upon the current thermal power $P_T$ supplied to the diesel-particulate filter 7. In particular, if the first regeneration step is performed during a town-driving profile, in which the likelihood of causing a thermal shock to the diesel-particulate filter 7 is very high, it is necessary to prolong the duration of the first regeneration step, whereas, in the case where the first regeneration step is performed during an out-of-town-driving profile, in which the temperature of the diesel-particulate filter 7 is usually high, the duration of the first regeneration step will be shorter than that of activation during the town-driving cycle.

For this reason, prior to activating the first regeneration step, the electronic control unit 20 selects the maximum duration $t_{MAX\_1}$ of the first regeneration step on the basis of the current driving profile.

In the case where, during the first regeneration step an event were to arise that interrupts said step, for example on account of the engine being turned off or of the maximum duration $t_{MAX\_1}$ of the first regeneration step or the maximum duration $t_{MAX}$ of the entire regeneration step being exceeded, or else because an error has occurred or a diagnosis has been started, the state machine returns again into the wait state A.

Furthermore, when carrying out the first regeneration step, the electronic control unit 20 monitors the residual amount $M_P$ of particulate in the diesel-particulate filter 7 and compares it with the threshold amount $M_{P\_TH2}$ stored.

As long as the residual amount $M_P$ of particulate in the diesel-particulate filter 7 is higher than the threshold amount $M_{P\_TH2}$, or else the duration of the first regeneration step is shorter than the maximum duration $t_{MAX\_1}$, the final-state machine remains in the first regeneration state C, thus continuing with the first step of regeneration of the diesel-particulate filter 7, whereas, when the residual amount $M_P$ of particulate in the diesel-particulate filter 7 is equal to or lower than the threshold amount $M_{P\_TH2}$, or when the duration of the first regeneration step exceeds the maximum duration $t_{MAX\_1}$ the final-state machine passes from the first regeneration state C to a second regeneration state, designated in FIG. 2 by 60 and in FIG. 3 by the letter D, in which the electronic control unit 20 activates the second step of regeneration of the diesel-particulate filter 7, during which a greater amount of particulate is burnt per unit time as compared to the amount burnt in the first regeneration step, i.e., during which the reaction of oxidation occurs at a faster rate as compared to the first regeneration step, and the particulate is burnt more rapidly.

With the second regeneration step it is possible to complete the process of regeneration of the diesel-particulate filter 7 and obtain total cleaning of the diesel-particulate filter 7 preventing, thanks to the gradual passage from the first regeneration state C to the second regeneration state D, the high temperature peaks and the high thermal gradients that tend to damage the diesel-particulate filter 7.

Also in this situation, in order to be able to perform the second regeneration step, it is necessary to control the temperature within the filter as well as the oxygen concentration that participates in the reaction, in such a way that the reaction of oxidation will occur effectively at a rate faster than that with which the reaction of oxidation of the first regeneration step occurs.

In particular, the second regeneration step at high rate is implemented by closed-loop control of the temperature within the diesel-particulate filter 7 as well as of the oxygen concentration that participates in the reaction of oxidation occurring within the diesel-particulate filter 7, setting as target values for the temperature $T_{IN}$ at inlet to the diesel-particulate filter 7 and for the oxygen concentration $K_{O2}$ in the exhaust gases the target temperature $T_{IN\_TARG\_2}$ and the threshold concentration $K_{O2\_TARG\_2}$ stored, respectively.

Control of the temperature at inlet to the diesel-particulate filter 7 and of the oxygen concentration $K_{O2}$ in the exhaust gases is performed in a way identical to the one described previously with reference to the first regeneration step.

Also the duration of the second regeneration step depends prevalently upon the driving profile in which it is executed, as well as upon the thermal power $P_T$ supplied to the diesel-particulate filter 7. Consequently, prior to activation of the second regeneration step, the electronic control unit 20 selects the maximum duration $t_{MAX\_2}$ of the second regeneration step on the basis of the current driving profile.

In the case where, during the regeneration step at high rate an event were to occur that interrupts said step, for example on account of turning off of the engine or the maximum duration $t_{MAX\_1}$ of the second regeneration step or the maximum duration $t_{MAX}$ of the entire regeneration step being exceeded, or else because an error has occurred or a diagnosis has started, the final-state machine returns again into the wait state A, into which it evolves also in the case where there is total emptying of the diesel-particulate filter 7.

Figure 4:
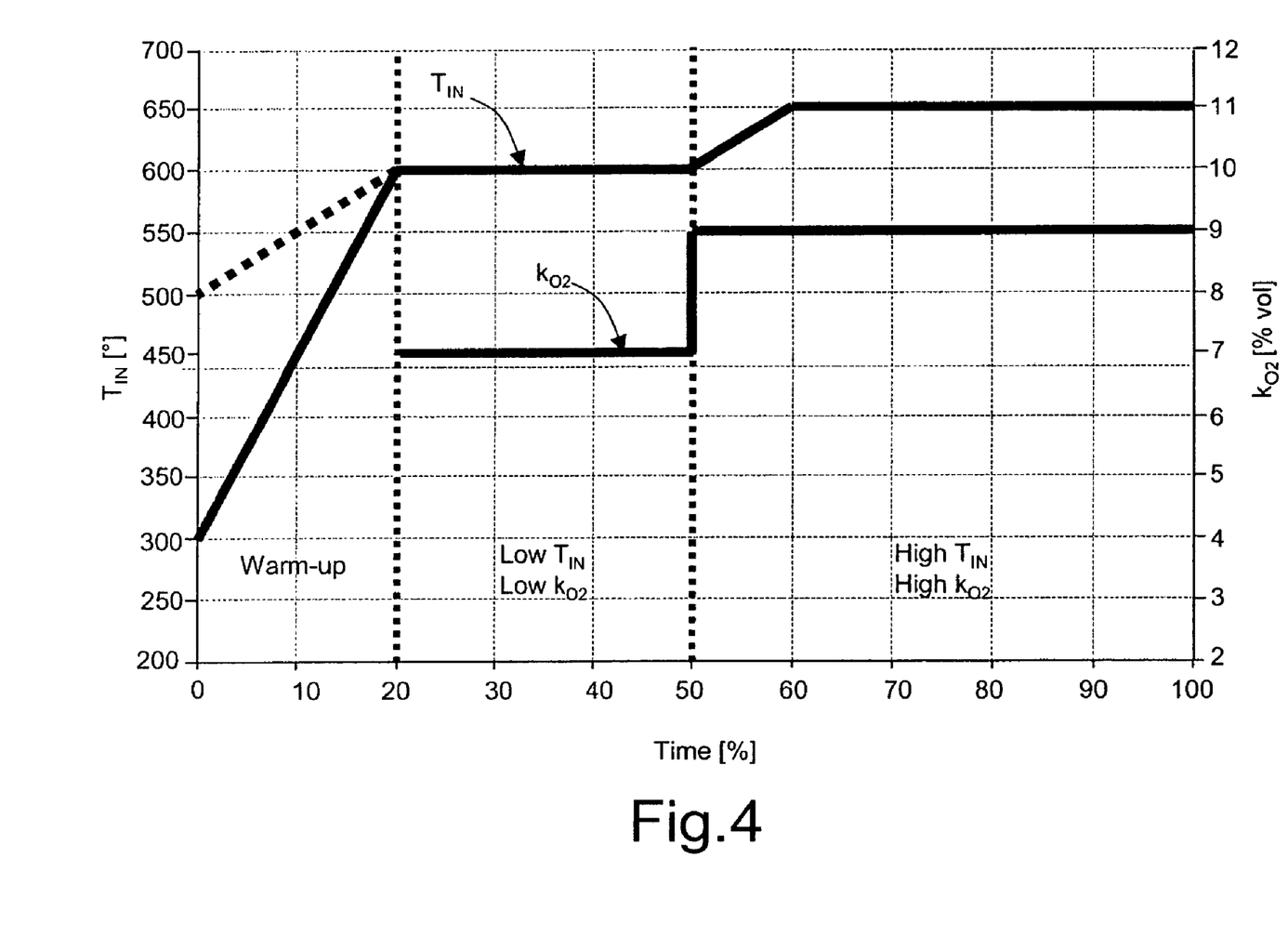
FIG. 4 shows a graph of the temperature at inlet to the diesel-particulate filter and of the concentration of oxygen in the exhaust gases that flow within the diesel-particulate filter during regeneration, according to the present invention.

FIG. 4 shows a graph that represents the evolution in time (normalized with respect to the maximum duration of the entire regeneration step) of the temperature $T_{IN}$ at inlet to the diesel-particulate filter 7 and the oxygen concentration in the exhaust gases that flow within the diesel-particulate filter 7 during the entire step of regeneration of the diesel-particulate filter 7 itself. It may be noted how in FIG. 4 the evolution of the oxygen concentration during the warm-up step is not represented in so far as the oxygen concentration is not controlled because in those conditions the particulate does not burn.

Finally, as regards the estimation of the amount of particulate $M_P$ accumulated in the diesel-particulate filter 7, this can be performed in different ways; for example, it may be estimated on the basis of:

a physical model of the same type as the one described in the European patent application No. EP 03001562.2 filed in the name of the present applicant on Jan. 23, 2003 and published on Aug. 6, 2003 under No. EP 1333165, the contents of which are to be considered entirely incorporated herein, said physical model enabling estimation of the amount of particulate accumulated in a given instant on the basis of the evaluation of the possible variations in the spatial distribution and/or in the physico-chemical properties of the particulate itself as a function of the conditions of operation of the engine and of the history of accumulation of the particulate in the diesel-particulate filter; in particular, the physical model initially determines a plurality of reference values of a parameter defining a relation between the amount of particulate that has accumulated in the diesel-particulate filter and the drop in pressure on the diesel-particulate filter itself, each of the reference values being associated to a respective stationary condition of operation of the engine in which particulate is accumulated in the diesel-particulate filter itself; in a given condition of operation of the engine, an operating value of said parameter is then determined as a function of the reference value of the parameter itself corresponding to the same stationary condition of operation of the engine and as a function of the history of accumulation of particulate in the diesel-particulate filter; said operating value of the parameter is then used for calculating the amount of particulate that has accumulated in the diesel-particulate filter;

a statistical model of the same type as the one described in the European patent application EP 04106454.4 filed in the name of the present applicant on Dec. 10, 2004 and published on Jun. 15, 2005 under No. EP 1541829, the contents of which are considered entirely incorporated herein, said statistical model being based upon collection, performed in field and with experimental tests, of data regarding the performance of a plurality of diesel-particulate filters in a wide range of conditions of operation of the engine, for example in idle conditions, in conditions of town driving, out-of-town driving and motorway driving and in conditions of high torque and high power; the data gathered enable creation of a statistics of the accumulation of particulate within the diesel-particulate filter as the time and point of engine operation vary; accumulation of particulate within the diesel-particulate filter is, in fact, a markedly non-linear process that depends upon time, but is also markedly affected by the engine operating point; said in-field collection of data makes it possible to correlate each individual engine point with a value corresponding to the amount of particulate accumulated in the diesel-particulate filter per unit time, which, at a given instant, is equal to the sum of the amount of particulate accumulated in time, to obtain as final result the estimation of the amount of particulate accumulated expressed as percentage of the optimal amount of particulate at which the process of regeneration starts; or else a mixed model of the same type as the one described in the aforementioned European patent application No. EP 1541829, which combines the characteristics of the physical model with those of the statistical model.

The advantages of the present invention are evident from what has been described previously. In particular, the method forming the subject of the present invention enables:

optimization of the process of regeneration of the diesel-particulate filter and preservation of the diesel-particulate filter from any damage caused by the high temperature peaks and high thermal gradients through control of the temperature peaks within the diesel-particulate filter throughout the range of operation of the engine;

handling of different types of substrate for the diesel-particulate filter according to the corresponding thermomechanical properties;

reduction in failure of the diesel-particulate filter during the life of the vehicle; and optimization of the warm-up step as a function of the thermo-fluid-dynamic conditions present at the moment of activation.

It is clear that modifications and variations may be made to the method described and illustrated herein without thereby departing from the sphere of protection of the present invention, as defined in the annexed claims.

For example, the regeneration of the diesel-particulate filter could be activated on the basis of criteria different from those described above. In particular, instead of being activated when the amount of particulate that has accumulated in the diesel-particulate filter exceeds a given threshold, regeneration of the diesel-particulate filter could be activated when the difference in pressure between the inlet and outlet of the diesel-particulate filter exceeds a given threshold indicating occlusion of the filter itself, or else on the basis of a criterion indicating the effective use of the vehicle, for example with a frequency linked to the distance travelled by the vehicle, for example every 500 or 1000 km.

In addition, the second regeneration step could be activated on the basis of criteria different from the ones described above. In particular, instead of being activated when the duration of the first regeneration step has exceeded a threshold duration that is a function of the driving profile of the vehicle or else the amount of residual particulate present within the diesel-particulate filter drops below a pre-set residual amount, the second regeneration step could be activated on the basis of just one of the two criteria described above.

Furthermore, the second regeneration step could be terminated on the basis of criteria different from the one described above. In particular, instead of terminating when the duration of the second regeneration step has exceeded a threshold duration that is a function of the driving profile of the vehicle, it could terminate when the residual amount of particulate within the diesel-particulate filter drops below a pre-set residual amount, preferably when the diesel-particulate filter is completely emptied. For said purpose, the present invention would hence also envisage calculation of the residual amount of particulate within the diesel-particulate filter not only during the first regeneration step, but also during the second regeneration step, this being a value used both for terminating the second regeneration step and as initial value in the calculation of the amount of particulate accumulated in the diesel-particulate filter for activation of subsequent regeneration thereof.

We claim:

1. A method for managing regeneration of a diesel-particulate filter for a gas-exhaust system in an internal-combustion engine of a vehicle, comprising the steps of:

varying the rate of regeneration of the diesel-particulate filter;

performing a first regeneration step during which the diesel-particulate filter is regenerated at a first regeneration rate;

subsequently performing at least one second regeneration step during which the diesel-particulate filter is regenerated at a second regeneration rate that is faster then the first regeneration rate;

verifying whether there exist conditions for activation of the first step of regeneration of the diesel-particulate filter and
    where said conditions exist, activating the first step of regeneration of the diesel-particulate filter; and
    where said conditions do not exist, creating the conditions for activation of the first step of regeneration of the diesel-particulate filter; and
wherein the conditions for activation of the first step of regeneration of the diesel particulate filter comprise:
    a temperature at the inlet ($T_{IN}$) to the diesel-particulate filter equal to or higher than a first threshold temperature ($T_{IN\_TH}$);
    a temperature within the diesel-particulate filter ($T_F$) equal to or higher than a second threshold temperature ($T_{F\_TH}$);
    a thermal power ($P_T$) supplied to the diesel-particulate filter equal to or higher than a threshold thermal power ($P_{T\_TH}$).

2. The method according to claim 1, in which the duration ($t_{Max\_1}$) of the first regeneration step is a function of a driving profile of the vehicle.

3. The method according to claim 1, in which the duration of the first regeneration step is a function of the residual amount ($M_P$) of particulate present in the diesel-particulate filter.

4. The method according to claim 3, in which the duration ($t_{MAX\_2}$) of the second regeneration step is a function of a driving profile of the vehicle.

5. The method according to claim 1, in which creating the conditions for activation of the first step of regeneration of the diesel-particulate filter further comprises:
    increasing the temperature at inlet to the diesel-particulate filter up to the first threshold temperature ($T_{IN}$);
    increasing the temperature within the diesel-particulate filter up to the second threshold temperature ($T_F$); and
    increasing the thermal power ($P_T$) supplied to the diesel-particulate filter up to the threshold thermal power ($P_{T\_TH}$).

6. The method according to claim 1, in which performing the first step of regeneration of the diesel-particulate filter further comprises:
    maintaining the temperature at inlet to the diesel-particulate filter at a first target temperature ($T_{IN\_TARG\_1}$); and
    maintaining the concentration ($K_{O2}$) of oxygen in the exhaust gases at a first target concentration ($K_{O2\_TARG\_1}$).

7. The method according to claim 6, in which performing the second step of regeneration of the diesel-particulate filter further comprises:
    maintaining the temperature at inlet to the diesel-particulate filter at a second target temperature ($T_{IN\_TARG\_2}$); and
    maintaining the concentration ($K_{O2}$) of oxygen in the exhaust gases at a second target concentration ($K_{O2\_TARG\_2}$).

8. The method of claim 7 wherein the second target temperature ($T_{IN\_TARG\_2}$) is higher than the first target temperature ($T_{IN\_TARG\_1}$), and the second target concentration ($K_{O2\_TARG\_2}$) is higher than the first target concentration ($K_{O2\_TARG\_1}$).

9. The method according to claim 1 wherein the transition from the first regeneration phase to the second regeneration phase occurs when the residual particulate amount ($M_P$) in the diesel particulate filter is lower than or equal to a threshold amount ($M_{P\_TH2}$) or when the duration of the first regeneration phase exceeds a predetermined duration ($t_{MAX\_1}$).

10. The method according to claim 1 wherein the transition from the first regeneration phase to the second regeneration phase occurs as a function of residual particulate amount ($M_P$) in the diesel particulate filter or of a duration ($t_{MAX\_1}$) of the first regeneration phase.

11. A method for managing regeneration of a diesel-particulate filter for a gas-exhaust system in an internal-combustion engine of a vehicle, comprising the step of:
    varying the rate of regeneration of the diesel-particulate filter during the regeneration of the diesel particulate filter, wherein varying the regeneration rate comprises,
        performing a first regeneration phase during which the diesel-particulate filter is regenerated at a first regeneration rate; and
        subsequently performing a second regeneration phase during which the diesel-particulate filter is regenerated at a second regeneration rate higher than the first regeneration rate; and
    activating the first regeneration phase when the following conditions occur:
        a temperature at an inlet of the diesel particulate filter is equal to or higher than a first threshold temperature ($T_{IN\_TH}$);
        a temperature within the diesel particulate filter is equal to or higher than a second threshold temperature ($T_{F\_TH}$); and
        a thermal power ($P_T$) supplied to the diesel-particulate filter is equal to or higher than a threshold thermal power ($P_{T\_TH}$).

* * * * *

UNITED STATES PATENT AND TRADEMARK OFFICE
CERTIFICATE OF CORRECTION

| | | |
|---|---|---|
| PATENT NO. | : 7,891,174 B2 | |
| APPLICATION NO. | : 11/812860 | |
| DATED | : February 22, 2011 | |
| INVENTOR(S) | : Gioannini et al. | |

It is certified that error appears in the above-identified patent and that said Letters Patent is hereby corrected as shown below:

On the title page, item (30) the date of the European Application, to which the above-identified U.S. Patent claims priority, should be corrected to read "June 28, 2006" instead of "June 6, 2008."

Signed and Sealed this
Fifth Day of November, 2013

Teresa Stanek Rea
*Deputy Director of the United States Patent and Trademark Office*